United States Patent [19]
Katafuchi et al.

[11] Patent Number: 5,881,062
[45] Date of Patent: Mar. 9, 1999

[54] METHOD OF CONCENTRATING SLAVE TERMINALS TO BE HUNTED IN A PACKET SWITCHING COMMUNICATION PATTERN USING A MASTER KEY NUMBER

[75] Inventors: Sunao Katafuchi; Naoto Nishiyama, both of Kawasaki, Japan

[73] Assignee: Fujitsu Limited, Kanagawa, Japan

[21] Appl. No.: 500,331

[22] Filed: Jul. 10, 1995

[30] Foreign Application Priority Data

Oct. 25, 1994  [JP]  Japan .................................. 6-259975

[51] Int. Cl.⁶ .............................. H04M 3/42; H04Q 5/20
[52] U.S. Cl. .......................... 370/356; 370/389; 370/434; 379/157; 379/165; 379/269
[58] Field of Search .................... 379/156, 157, 379/164, 165, 201, 219, 220, 268, 269, 274, 289; 340/825.03, 826, 825.06; 370/351, 356, 357, 360, 389, 420, 433, 434

[56] References Cited

U.S. PATENT DOCUMENTS

| | | | |
|---|---|---|---|
| 4,686,669 | 8/1987 | Chang | 370/54 |
| 4,689,815 | 8/1987 | Grewal et al. | 379/269 |
| 4,694,487 | 9/1987 | Chang et al. | 379/269 |
| 4,720,854 | 1/1988 | Sand | 379/269 |
| 4,791,662 | 12/1988 | Ahnen et al. | 379/158 |

*Primary Examiner*—Alpus H. Hsu
*Attorney, Agent, or Firm*—Helfgott & Karas, PC.

[57] ABSTRACT

In an incoming call communication service using key groups to be hunted provided through a switching system, there is provided a master terminal for a group formed of a plurality of slave terminals and a call to the master terminal is connected to a call-acceptable slave terminal in the group. In this case, certain slave terminals in the group are concentrated with the other certain slave terminals without canceling the communication links at slave terminals in terminating connection. The state of use of slave terminals after slave terminal concentration is notified to the master terminal.

10 Claims, 9 Drawing Sheets

METHOD OF CONCENTRATING SLAVE TERMINALS TO BE HUNTED IN A PACKET SWITCHING COMMUNICATION PATTERN USING A MASTER KEY NUMBER

BACKGROUND OF THE INVENTION

1. Field of the Invention

The present invention relates to a key groups to be hunted in an incoming call communication system. More particularly, the invention relates to a method of concentrating key groups to be hunted among incoming call terminals, which is used in a data switching system performing packet switching, frame relay switching, ATM (asynchronous transfer mode) switching and so forth, and also relates to a switching system carrying out said method.

2. Description of the Related Art

The incoming call communication service using key groups to be hunted provided through a telephone switching system, a data switching system and so on, is a service that, in the switching system like the above, provides a key number for a plurality of subscriber terminals and if a call selects the key number, the call is made to connect with an arbitrary idle subscriber terminal among the plural subscriber terminals. This service has already been considerably popularized.

In the incoming call communication service using key groups to be hunted like this, it is desirous that concentration of slave terminals in key groups to be hunted (merely referred to as a slave terminal or slave terminals hereinafter) can be performed without canceling the counterpart communication link, and also that the state of use of slave terminals after concentration thereof can be notified to a master terminal in key groups to be hunted (referred to as master terminal hereinafter).

Heretofore, this kind of technology has been disclosed by Japanese Unexamined Patent Publication (KOKAI) No. 63-16743 entitled "Key Number Control System." This publication describes that if the master terminal of the key number terminal group is in communication, a terminating call side switching system selects an idle slave terminal from the terminal group having key number, thereby establishing a communication line therethrough.

Hitherto, in the incoming call communication service using key groups to be hunted provided through a packet switching system, communication via an identical slave terminal was fixed to that terminal during the time from establishment of a call to cancellation of the same, so that it was not possible to change terminals among a group of slave terminals. It was also not possible to notify the state of use of slave terminals to the master terminal.

So far, in the incoming call communication service using key groups to be hunted provided through the packet switching system, communication was performed with an identical slave terminal during the time from establishment of a call to cancellation of the same, so that terminal change among a group of slave terminals was not possible. It was impossible, therefore, to effectively make use of slave terminals in correspondence with the state of communication traffic. For instance, communication links at respective slave terminals are usually less used at midnight, thus being made use of ineffectively.

If, therefore, it is possible to concentrate certain slave terminals onto certain other terminals, it becomes possible to make use of the former terminals for other purposes and also to design advantageous ways of use of slave terminals as a whole. However, there has been no proposal thus far on how to carry out such slave terminal concentration. Further, in the case of carrying out the slave terminal concentration, it is desirous to notify the state of current use of slave terminals to the master terminal after completion of the concentration, but there has been no prior art teaching how to make such a notice to the master terminal.

SUMMARY OF THE INVENTION

The present invention has been made to solve the problems involved in the prior art as described above. Accordingly, an object of the invention is to provide a method of concentrating key groups to be hunted in an incoming call terminals, wherein in an incoming call communication service using key groups to be hunted provided through the packet switching system, it is made possible that concentration of slave terminals can be performed at an arbitrary point of time without canceling the communication links of slave terminals, and that the state of use of slave terminals after concentration thereof can be notified to the master terminal, and also to provide a switching system for carrying out the method.

In a first aspect of the present invention, there is provided a method of concentrating key groups to be hunted in an incoming call terminals for use in the incoming call communication service using key groups to be hunted provided through a switching system in which a master terminal is provided to a group formed of a plurality of slave terminals and a call to the master terminal can be connected with a call-acceptable slave terminal in the group, wherein certain slave terminals in the group can be concentrated onto the other certain slave terminals without canceling the communication links at slave terminals in communication and the state of use of slave terminals after slave terminal concentration can be notified to the master terminal.

In a second aspect of the present invention, there is provided a method of concentrating key groups to be hunted in an incoming call terminals for use in the incoming call communication service using the key groups to be hunted provided through a switching system in which a master terminal is provided to a group formed of a plurality of slave terminals and a call to the master terminal can be connected with an idle slave terminal in the group, wherein if the master terminal requests slave terminal concentration through a change request reception portion in key terminals to be hunted, a communication link control portion in key terminals to be hunted managing the establishment of a communication link at slave terminals, judges the propriety of slave terminal concentration, and if possible, requests a change control portion in key terminals to be hunted to carry out the slave terminal concentration without canceling the communication links to counterpart terminals, and upon completion of the slave terminal concentration, the communication link control portion in key terminals to be hunted notifies the resultant state of use of slave terminals after the slave terminal concentration to the master terminal through the change request reception portion in key terminals to be hunted.

In a third aspect of the present invention, there is provided a switching system in which a master terminal is provided to a group formed of a plurality of slave terminals and a call to the master terminal can be connected with a call-acceptable slave terminal in the group, the switching system comprising a communication link control portion in key terminals to be hunted, which manages the establishment of a communication link at the master terminal on a real time basis, a change request reception portion in key terminals to be hunted, which receives a request for slave terminal concentration from the master terminal and instructs the communication link control portion in key terminals to be hunted to perform slave terminal concentration, and a change control portion in key terminals to be hunted, which performs control for concentration of the plural slave terminals based on the instruction from the communication link control portion in key terminals to be hunted.

Other features and advantages of the invention will be made clear from the following description with reference to the accompanying drawings.

DESCRIPTION OF THE PREFERRED EMBODIMENTS

Before entering into a detailed explanation of embodiments of the present invention, an outline thereof will be given below with reference to the drawings.

Figure 1:
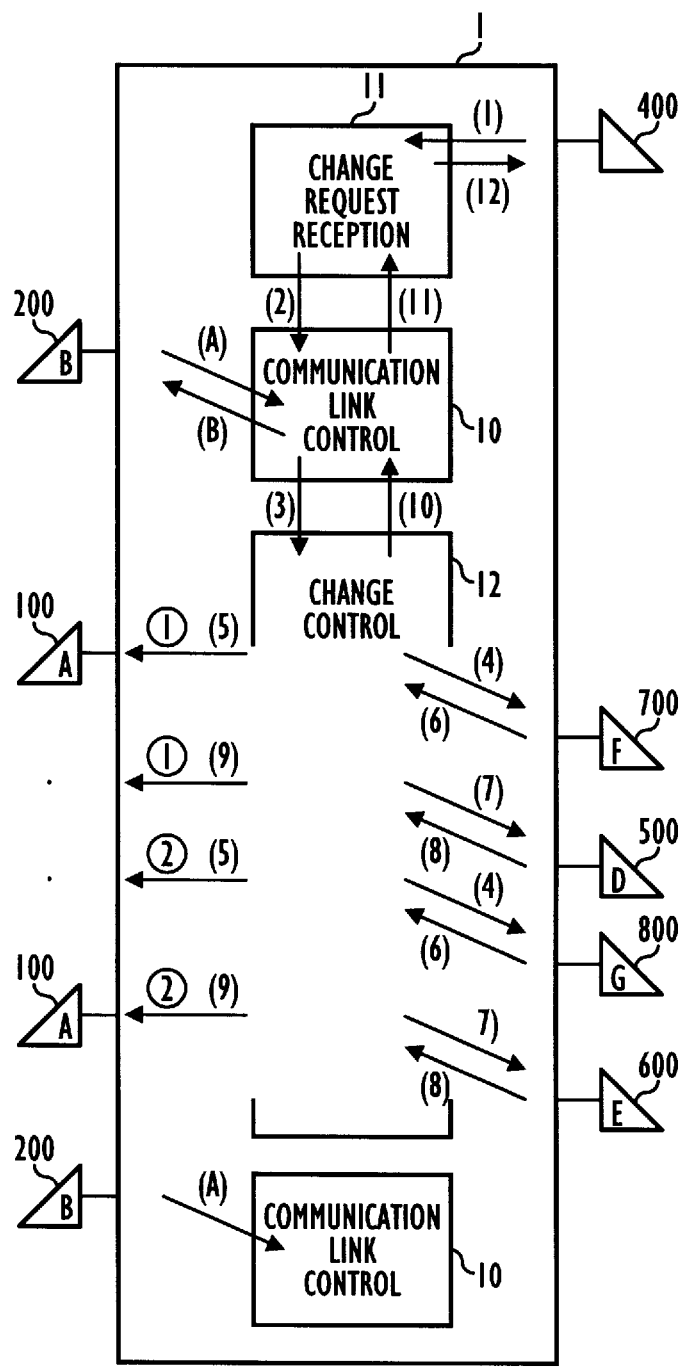
FIG. 1 is a block schematic representation showing the constitution of the present invention.

FIG. 1 is a schematic representation showing the constitution of the present invention. In the figure, a reference numeral 1 designates a packet switching system. In this system, a communication link control portion 10 in key terminals to be hunted manages the establishment of a communication link at a master terminal 400 on a real time basis. A change request reception portion 11 in key terminals to be hunted receives a request for slave terminal concentration from the master terminal 400 and instructs the communication link control portion 10 in key terminals to be hunted to carry out the instruction. A change control portion 12 in key terminals to be hunted carries out the control for concentration of slave terminals D (500), E (600), F (700), and G (800), based on the instruction from the communication link control portion 10 in key terminals to be hunted.

(1) In the incoming call communication service using key groups to be hunted as provided through a switching system in which there is provided a master terminal 400 to a group formed of a plurality of slave terminals D (500) through G (800), and a call to the master terminal 400 is made to connect with a call-acceptable slave terminal of the group, certain slave terminals in the group are concentrated onto certain other terminals of the same without canceling the communication links at the slave terminals in communication. Further, the state of use of slave terminals after the slave terminal concentration is notified to the master terminal 400.

(2) In the incoming call communication service using key groups to be hunted provided through a switching system in which there is provided a master terminal 400 to a group formed of a plurality of slave terminals D (500) through G (800) and a call to the master terminal 400 is made to connect with an idle slave terminal of the group, if the master terminal 400 requests slave terminal concentration through the change request reception portion 11 in key terminals to be hunted, the communication link control portion 10 in key terminals to be hunted managing the establishment of communication links at slave terminals judges the propriety of the requested slave terminal concentration and if possible, requests the change control portion 12 in key terminals to be hunted to carry out the slave terminal concentration without canceling the communication link to a counterpart terminal, and upon completion of the requested concentration, the communication link control portion 10 in key terminals to be hunted notifies the state of use of the concentrated slave terminals to the master terminal 400 through the change request reception portion 11 in key terminals to be hunted.

(3) In the case (2) as described above, while slave terminal concentration is being processed, the communication link control 10 in key terminals to be hunted regulates the communication to the counterpart terminal, and removes the regulation upon completion of the slave terminal concentration process.

(4) In the case (2) or (3) as described above, there is provided a key selection list 13 (FIG. 5) indicating the call-acceptable or call-not-acceptable state at respective slave terminals. The communication link portion 10 in key terminals to be hunted renews the state of respective slave terminals as indicated in the key selection list 13 in correspondence with the setting state of communication links at respective slave terminals. At the time of carrying out slave terminal concentration, the communication link control portion 10 in key terminals to be hunted judges propriety of slave terminal concentration referring to the key selection list 13 and if possible, instructs the change control portion 12 in key terminals to be hunted to execute slave terminal concentration.

(5) In the case (4) as mentioned above, the key selection list 13 is arranged to include a column indicative of the number of idle links in the respective slave terminals. Referring to this list, the communication link control 10 in key terminals to be hunted counts the number of idle links from the terminal number, from which the concentration is to be started, and determines the sum thereof, and compares the sum of idle links with the number of incoming call links. If the former is less than the latter, the communication link control 10 in key terminals to be hunted judges that concentration is impossible, while it judges that the concentration can be allowed if the former exceeds the latter.

(6) In the case (4) or (5), the key selection list 13 displays a message "Concentrating a key selection" or "Not concentrating a key selection". If a request for setting a communication link is made by the other terminal, the communication link control portion 10 in key terminals to be hunted refers to the key selection list 13 and rejects the request if the message is "Concentrating a key selection" and allows the same if the message is "Not concentrating a key selection."

If the change request reception portion 11 in key terminals to be hunted receives a request (1) for slave terminal concentration from the master terminal 400 (see FIG. 1), it instructs the communication link control portion 10 in key terminals to be hunted to make a judgment regarding slave terminal concentration and to carry out the same (2) (see FIG. 1). Then, the communication link control portion 10 in key terminals to be hunted judges propriety of slave terminal concentration based on the state of the communication links.

For instance, when a request (A) for establishing a communication link is made by a terminal B (200), if the degree of congestion is high and slave terminal concentration is difficult, the request is rejected (B) and the state of current use of slave terminals is notified to the master terminal 400. On the other hand, a request (A) for establishing a communication link by the terminal B (200) is allowed if the degree of congestion is low, thus the concentration is able to be carried out.

If slave terminals are in the state where concentration thereof is possible, the communication link control portion 10 in key terminals to be hunted makes a request (3) for execution of slave terminal concentration to the change control portion 12 in key terminals to be hunted, which in turn makes a request (4) for cancellation of communication links to the concerned slave terminals F (700) and G (800) and at the same time, transmits a notice (5) indicating that communication is under regulation, to the counterpart communication links ① and ②.

When a communication link cancellation confirmation response (6) is received from slave terminals F (700) and G (800), a request (7) for establishing communication links in order to establish a call is made to destination slave terminals D (500) and E (600) in the process of slave terminal change. When establishment of a call is completed and an establishment of communication link setting confirmation response (8) is received, a notice (9) of removal of the communication regulation is sent to counterpart communication links ① and ②, thereby ending the process of slave terminal concentration.

When the change control portion 12 in key terminals to be hunted completes the process of slave terminal concentration, it transmits a report (10) on completion of the concentration process to the communication link control portion 10 in key terminals to be hunted, which in turn transmits a notice (11) regarding slave terminals currently in use to the change request reception portion 11 in key terminals to be hunted, through which the master terminal 400 receives a notice (12) in response regarding the state of use of terminals, which advises that slave terminals D (500) and E (600) are currently being used.

Figure 2A:
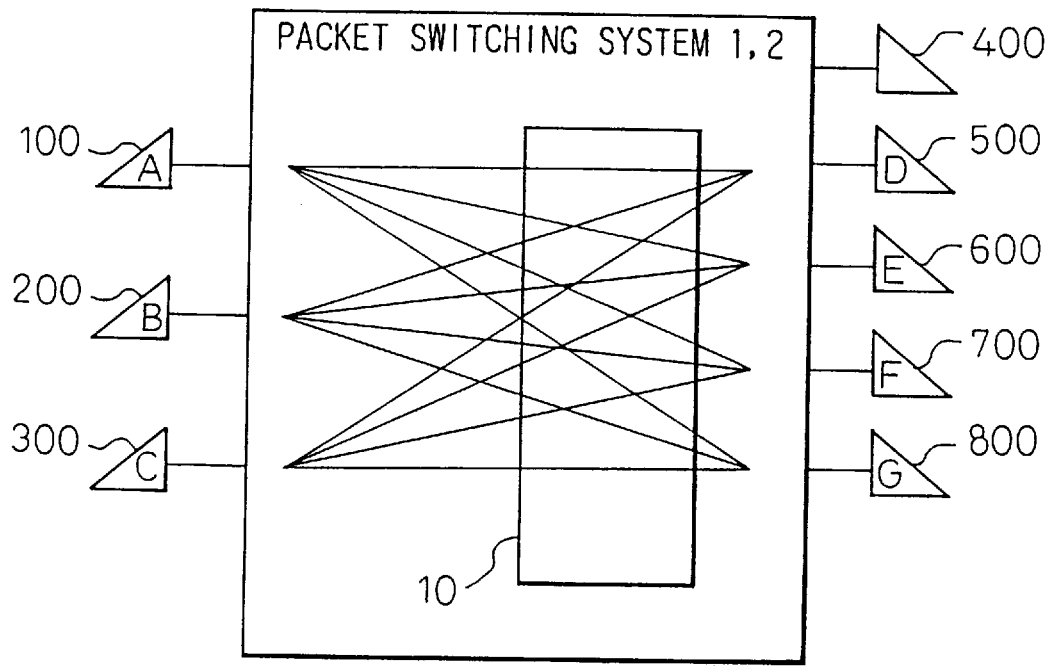
FIG. 2A is a diagrammatic representation for explaining the function of the invention, and shows a state of communication where slave terminal concentration is not possible.
Figure 2B:
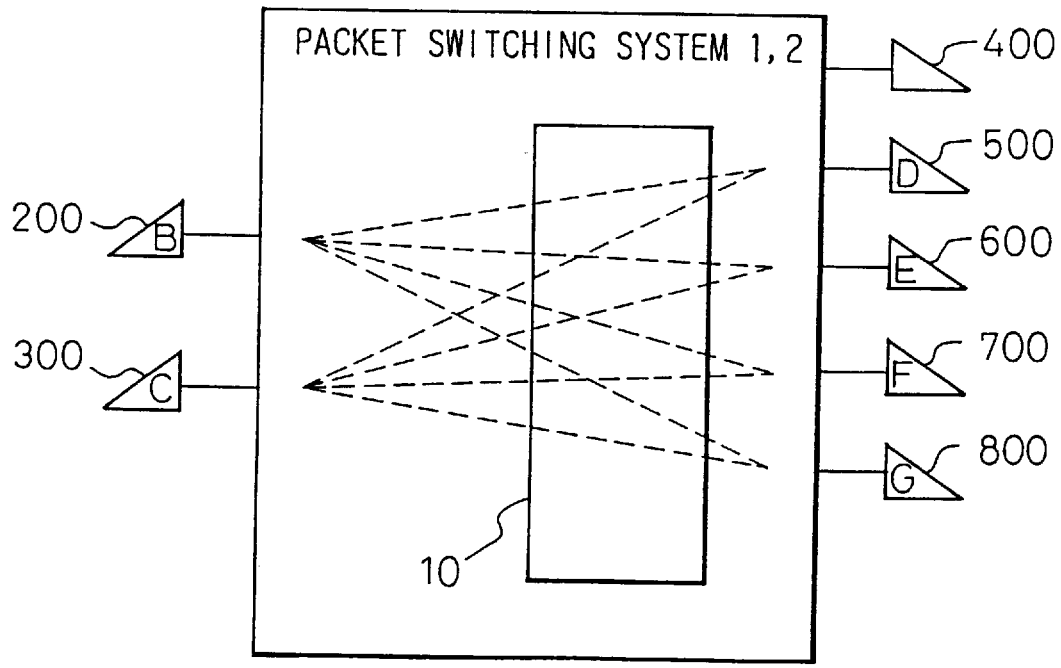
FIG. 2B is a diagrammatic representation for explaining the function of the invention, and shows a state of communication where slave terminal concentration is possible.

FIGS. 2A and 2B are diagrammatic representations for explaining the function of the present invention. FIG. 2A shows the state of communication where slave terminal concentration is not possible while FIG. 2B illustrates the state where slave terminal concentration is possible. In FIGS. 2A and 2B, there is shown the status of establishment of communication links between one group consisting of the master terminal 400 and slave terminals D (500), E (600), F (700), G (800), all of these belonging to the packet switching system 1, and the other group consisting of terminals A (100), B (200), C (300), all of these belonging to the packet switching system 2. Solid lines represent the situation that communication links are being established while dotted lines represent the situation that communication links are being canceled.

In the packet switching system of FIG. 1, if communication links to subscriber terminals B (200) and C (300) are canceled as shown in FIG. 2B after subscriber terminals A (100), B (200), and C (300) have established communication links to the master terminal 400 as shown in FIG. 2A, the state of traffic at key terminals to be hunted will be sufficiently dealt with only by slave terminals D (500) and E (600). The state of communication links like this is managed by the communication link control portion 10 in key terminals to be hunted.

In a situation like this, the master terminal 400 instructs the change request reception portion 11 in key terminals to be hunted to carry out slave terminal concentration. In compliance with this instruction, the change request reception portion 11 in key terminals to be hunted instructs the communication link control portion 10 in key terminals to be hunted to judge propriety of slave terminal concentration and to carry out, the same if possible. The communication link control portion 10 in key terminals to be hunted judges the possibility of slave terminal concentration referring to the state of current use of the links, and if judged possible, it instructs the change control portion 12 in key terminals to be hunted to perform slave terminal concentration and at the same time, to reject all the terminating connections to the slave terminals in process of the concentration.

In the change control portion 12 in key terminals to be hunted, transfer of corresponding links is performed, and after cancellation of the communication links to slave terminals F (700) and G (800), the request for establishment of communication links is made to slave terminals D (500) and E (600), and at the same time, a notice of communication regulation is transmitted to a counterpart. After establishing new communication links to slave terminals D (500) and E (600), a notice of cancellation of communication regulation is transmitted to the counterpart, thereby ending the process of slave terminal concentration, and the state of current use of slave terminals being notified to the master terminal 400.

As described above, according to the present invention, slave terminal concentration can be carried out in response to the request from the master terminal without canceling the communication links to the counterpart of the incoming call slave terminal, and the state of current use of slave terminals after concentration thereof can be notified to the master terminal.

Figure 3A:
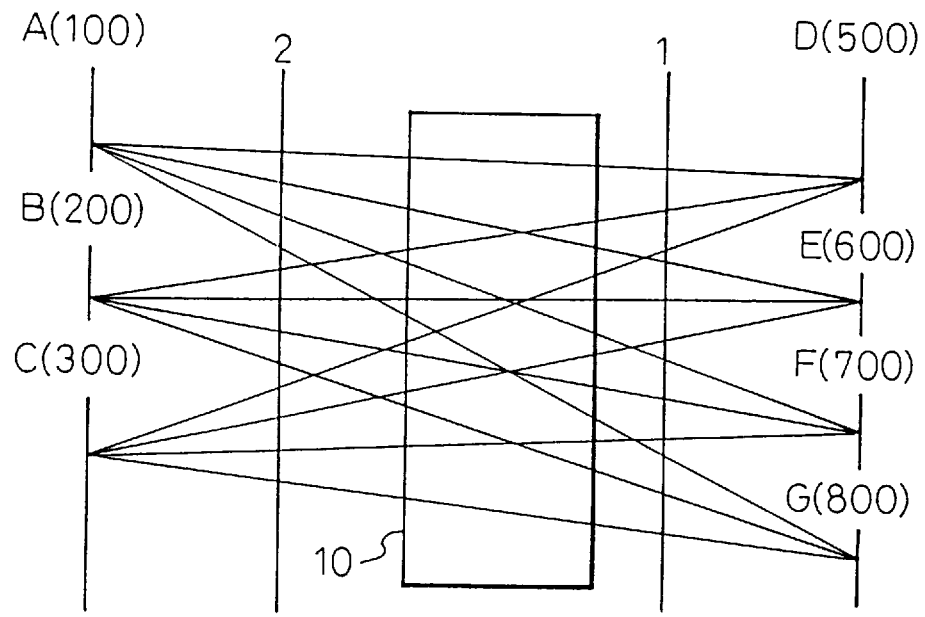
FIG. 3A is a diagrammatic representation showing the state of use of respective slave terminals where all the slave terminals are in use.
Figure 3B:
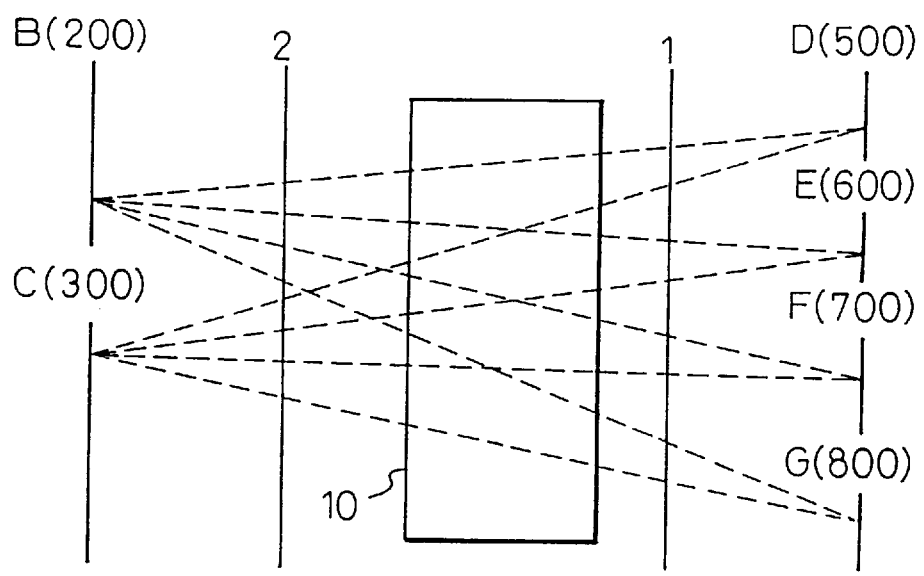
FIG. 3B is a diagrammatic representation showing the state of use of respective slave terminals where slave terminal concentration is possible.
Figure 4:
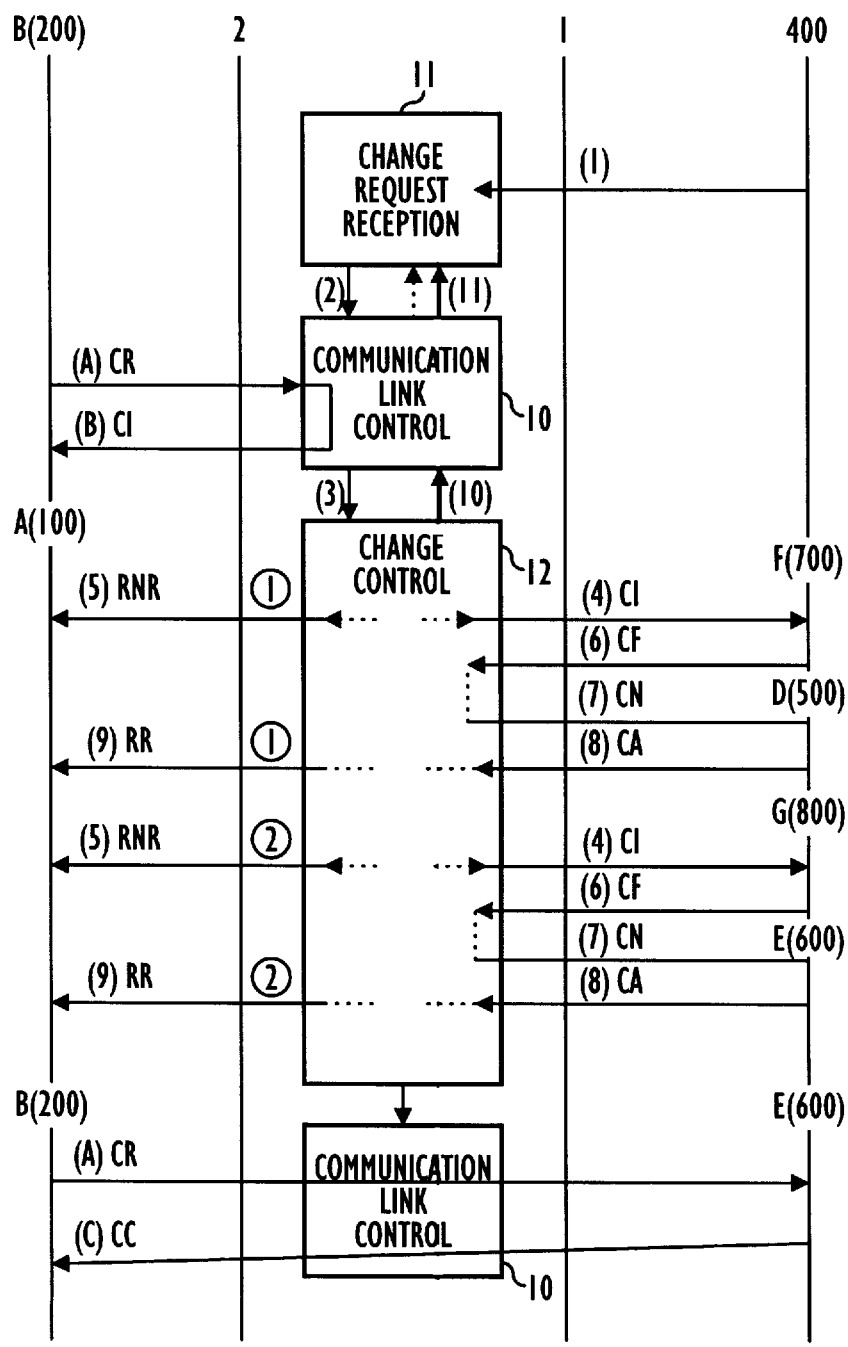
FIG. 4 is a diagrammatic representation for explaining processings at respective portions in the embodiment (1) according to the invention.

Embodiments according to the present invention will now be described with reference to FIGS. 3A through 9B. FIGS. 3A and 3B show the state of use of respective slave terminals. FIG. 3A shows the situation where all the slave terminals are in use while FIG. 3B illustrates the situation where slave terminal concentration can be carried out. FIG. 4 is a diagrammatic representation for explaining the proceedings to be carried out in respective portions in the embodiment (1) according to the present invention. In these figures, like parts in FIG. 1, FIGS. 2A and 2B carry like reference numerals. A method of concentration of key groups to be hunted in an incoming call terminals according to the present invention will be explained below, with reference to FIGS. 3A and 3B, and FIG. 4.

As shown in FIG. 3A, in the situation where all the slave terminals are in use and no concentration thereof is possible, if communication links to the terminal C (300) are canceled and the master terminal 400 makes a request (1) for slave terminal concentration to the change request reception portion 11 in key terminals to be hunted, this portion 11 sends an instruction (2) to the communication link control portion 10 in key terminals to be hunted to judge propriety of slave terminal concentration and to execute the concentration.

Then, the communication link control portion 10 in key terminals to be hunted judges propriety of slave terminal concentration referring to the state of current use of slave terminals, and rejects all the terminating calls until slave terminal concentration is over if the situation allows it. For instance, if a request (A) for establishment of communication links is made from the terminal B (200) with a CR (Call Request) packet, the communication link control portion 10 in key terminals to be hunted returns a rejection (B) of the request with a CI (Clear Indication) packet.

The communication link control portion 10 in key terminals to be hunted judges the number of links in use at respective slave terminals and sends a request (3) for slave terminal concentration to the change control portion 12 in key terminals to be hunted if it is possible to have some slave terminals concentrated onto the others. On the contrary, if it is determined, as a result of the judgment of the number of links in use, that the concentration is not possible, the communication link control portion 10 in key terminals to be hunting reports which slave terminals are currently in use, i.e., slave terminals D (500), E (600), F (700), and G (800), to the master terminal 400 through the change request reception portion 11 in key terminals to be hunted.

In the change control portion 12 in key terminals to be hunted, the process of transferring communication links is carried out over a communication link ① between the slave terminal F (700) and the counterpart terminal A (100) as well as a communication link ② between the slave terminal G (800) and the counterpart terminal A (100), as the concentration.

A communication link cancellation request (4) for the communication link ① is made to the slave terminal F (700) with a CI packet while a notice (5) of communication regulation is dispatched to the counterpart terminal A (100) with a RNR (Receive Not Ready) packet.

After receiving a confirmation response (6) of cancellation of communication link which means confirmation of cancellation of call establishment, from the slave terminal F (700) with a CF (Clear Confirmation) packet, the request (7) for establishing a communication link is made to the slave terminal D (500) with a CN (Incoming Call) packet for call establishment. When a confirmation response (8) of establishment of communication link which means reception of the request for call establishment, is received from the slave terminal D (500) with a CA (Call Accepted) packet, a notice (9) indicating cancellation of communication regulation is transmitted to the counterpart terminal A (100) with a RR (Receive Ready) packet. Through this process of communication link transfer, the communication link ① is transferred between the slave terminal D (500) and the counterpart terminal A (100).

In the same way as in the case of communication link ②, a request (4) for cancellation of the concerned communication link is made to the slave terminal G (800) with a CI packet while a notice (5) of communication regulation is transmitted to the counterpart terminal A (100) with a RNR (Receive Not Ready) packet. After receiving a communication link cancellation confirmation response (6) from the slave terminal G (800), a request (7) for establishing a communication link is made to the slave terminal D (500) with a CN packet for establishing a call. When a confirmation response (8) for establishing a communication link is received from the slave terminal D (500) with a CA (Call Accepted) packet, a notice (9) of cancellation of communication regulation is transmitted to the counterpart terminal A (100) with a RR packet. Through this communication link transfer procedure, the communication link ② is transferred between the slave terminal E (600) and the counterpart terminal A (100).

Having finished slave terminal concentration over all the communication links concerned, the change control portion 12 in key terminals to be hunted transmits a report (10) on completion of the slave terminal concentration process to the communication link control portion 10 in key terminals to be hunted. Under this situation, the key terminal to be hunting communication link control portion 10 allows a new incoming call request from the counterpart terminal B (200) and at the same time, transmits a slave terminal report (11) indicative of the state of use of slave terminals after terminal change, to the change request reception portion 11 in key terminals to be hunting, which in turn notifies the state of use of slave terminals after terminal change i.e., slave terminals D (500) and E (600) being in use, to the master terminal 400.

In this situation, if the counterpart terminal B (200) makes a request (A) for establishment of a communication link with a CR packet and the slave terminal E (600) transmits a notice of completion of establishment of communication link (C) with a CC (Call Connected) packet, the terminal B (200) and the slave terminal E (600) enters in the communicable state.

Figure 5:
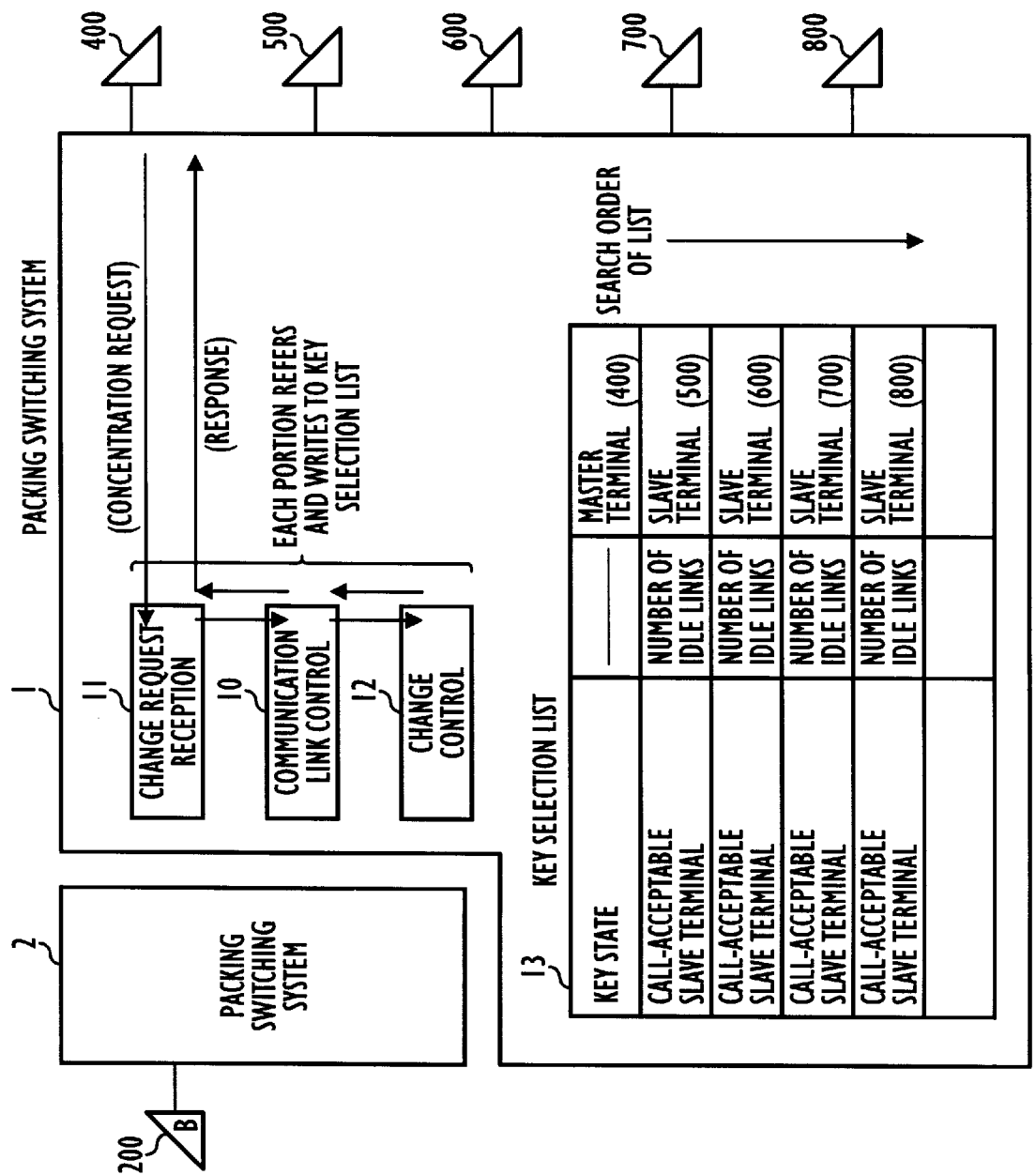
FIG. 5 is a diagrammatic representation for explaining processings at respective portions in the embodiment (2) according to the invention.

FIG. 5 is a diagrammatic representation for use in explanation of respective parts in embodiment (2) according to the present invention. In this figure, like parts to those in FIG. 4 carry like reference numerals. Reference numeral 13 designates a key selection list arranged in the form of a table which is divided into a plurality of small columns indicating "Key State," "Master Terminal," "Call-acceptable Slave Terminal," "Number of Idle Links," and "Slave Terminal," respectively.

In the key selection list 13, the column "Key State" indicates the state of "Concentrating a key selection" or "Not concentrating a key selection." The former indicates that key terminals to be hunting are in the call-not-acceptable state while the latter indicates that key terminals to be hunted are in the call-acceptable state.

In the list 13, columns "Call-acceptable Slave Terminal" indicate whether a slave terminal is in the state of "call-acceptable" or "call-not-acceptable" depending on the "open" or "closed" state of logical channels corresponding to respective slave terminals. If the column indicates "call-acceptable," it means that the corresponding slave terminal can be selected as a call-acceptable terminal while if the column indicates "call-not-acceptable," it means that the corresponding terminal cannot be selected as a call-acceptable terminal and the key terminals to be hunted search is to be moved to the next slave terminal. The column "Master Terminal" indicates subscriber terminal number while "Slave Terminal" indicates subscriber terminal numbers corresponding to the slave terminals D (500) through G (800), respectively. The column "Number of Idle Links" indicates the number of idle slave links corresponding to slave terminals D (500) through G (800), respectively.

Figure 6:
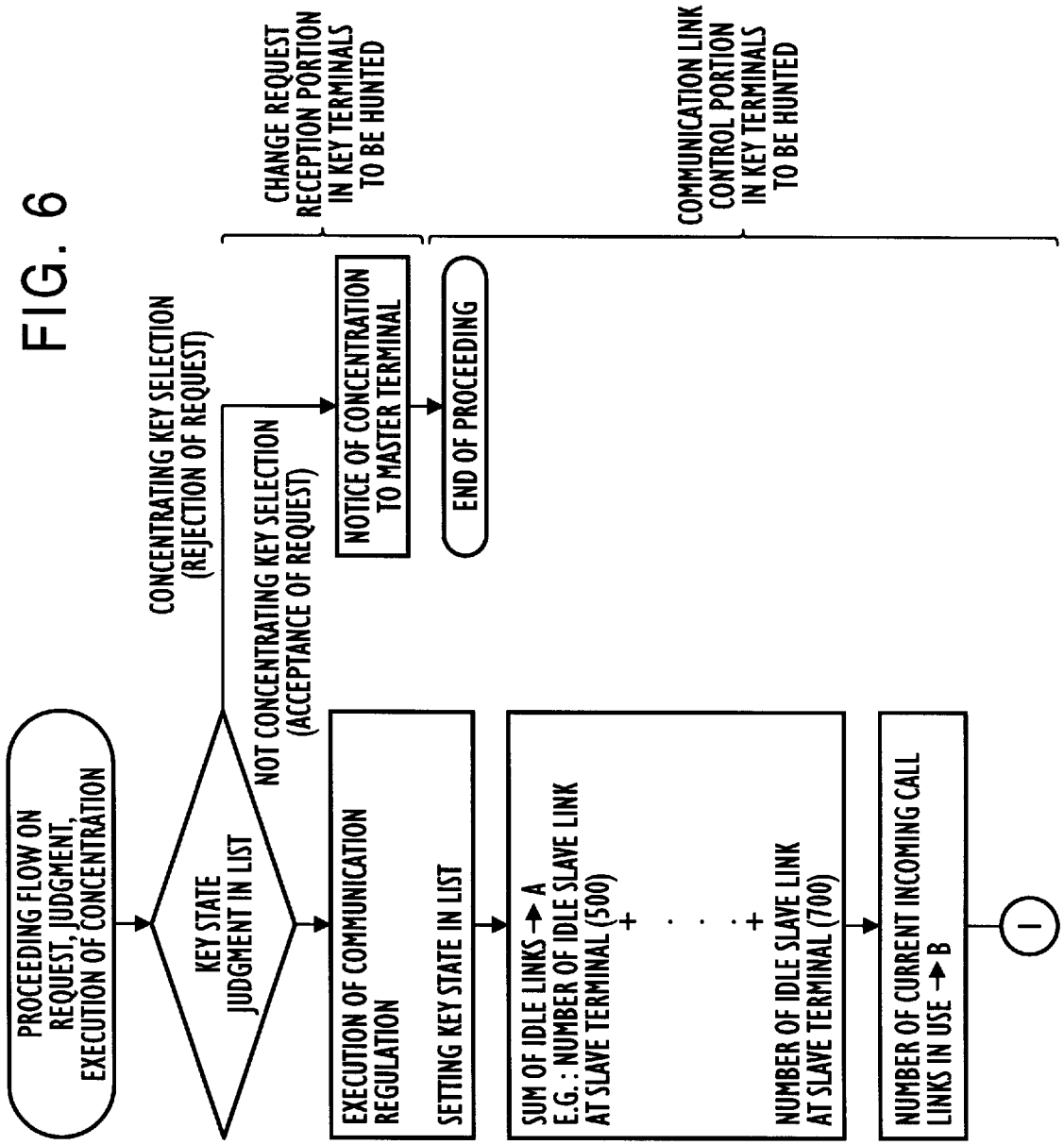
FIG. 6 is a flowchart showing the processings (1) from the step of judging propriety of slave terminal concentration to the step of selecting slave terminals to be concentrated in the embodiment (2) according to the invention.
Figure 7:
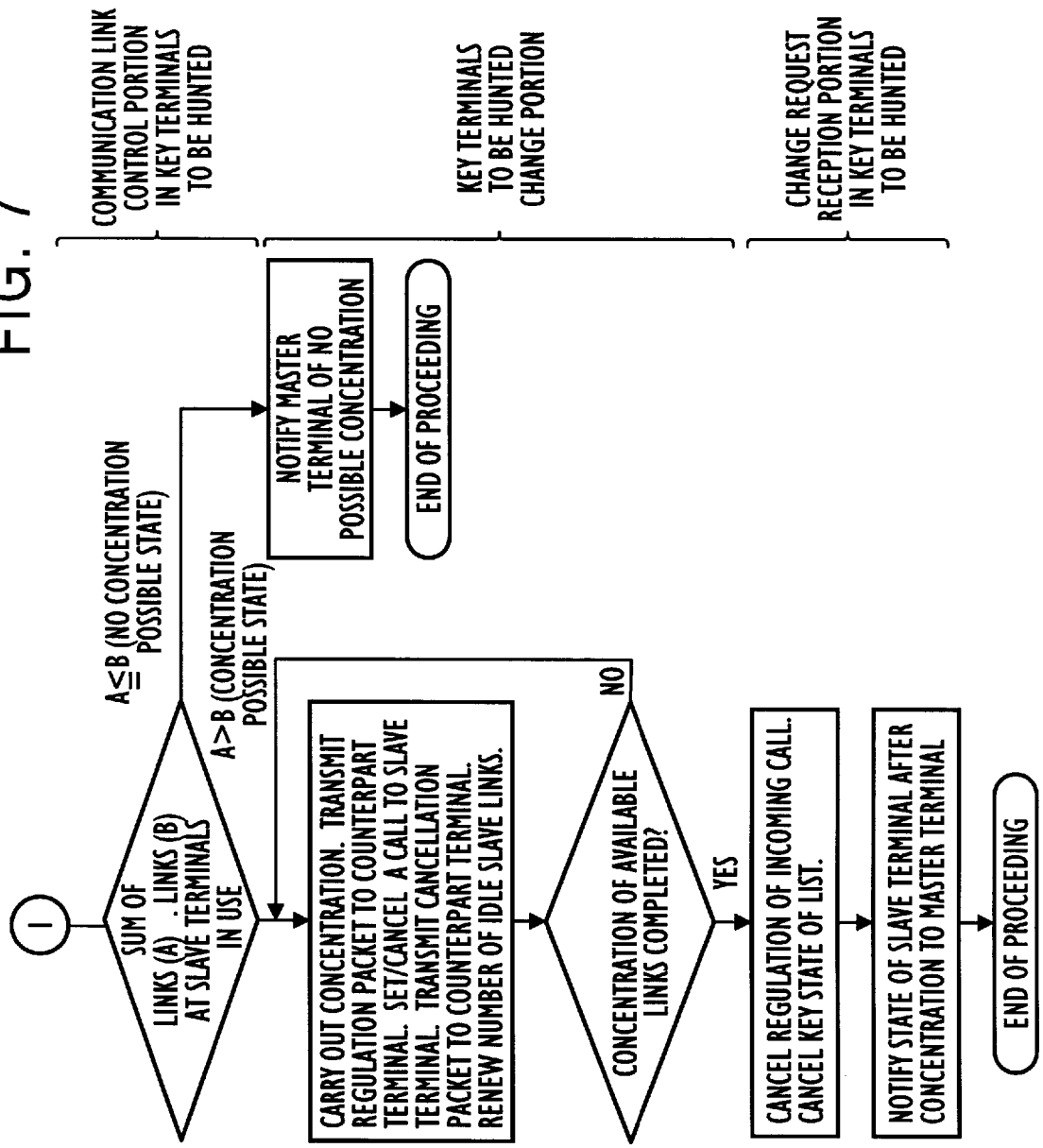
FIG. 7 is a flowchart showing the processings (2) from the step of judging propriety of slave terminal concentration to the step of selecting slave terminals to be concentrated in the embodiment (2) according to the invention.

FIGS. 6 and 7 are flowcharts showing processes (1) and (2) from judgment of propriety of slave terminal concentration to selection of slave terminals to be concentrated in the embodiment (2) according to the present invention. Processing in this embodiment will be explained in the following, referring to FIG. 5 through FIG. 7.

The communication link control portion 10 in key terminals to be hunted for managing the state of establishment of communication links at respective slave terminals, judges the possibility of selecting each of slave terminals as a call-acceptable slave terminal, referring to the state of use of communication links, and renews the indication of the column "Call-acceptable Slave Terminal" with logic 0 or 1 depending on whether the slave terminal is call-acceptable or call-not-acceptable in the key selection list 13, and at the same time, displays the number of idle slave links corresponding to respective slave terminals.

Request for slave terminal concentration, judgment of propriety thereof, and execution of concentration are carried out according to a process flow as described in the following. At this time, an input parameter in a request for slave terminal concentration is the number of a slave terminal designated by the master terminal 400, from which concentration of slave terminals is started.

The change request reception portion 11 in key terminals to be hunted refers to the column "Key State" in the key selection list 13, and if the column indicates "Concentrating a key selection," the reception portion 11 rejects reception of the request for slave terminal concentration, and notifies the master terminal of "Concentrating a key selection," thereby ending the process. If the column indicates "Not concentrating a key selection," the change request reception portion 11 in key terminals to be hunted regulates the incoming call and revises the indication of the column "Key State" in the list 13, accordingly.

The communication link control portion 10 in key terminals to be hunted refers to the list 13 and calculates a sum of the number of links at concentrateable slave terminals, i.e., a sum of the number of idle links as obtained by counting from the slave terminal number from which the terminal concentration starts, for instance a sum A of idle slave links corresponding to slave terminals (500) through (700). The communication link control portion 10 in key terminals to be hunted also calculates the number B of links currently in use. Comparing A with B. if A=B or A<B, the slave terminal concentration is not possible, and the control portion 10 advises the master terminal 400 thereof, thereby ending the process.

If A>B, slave terminal concentration is possible, so that the change control portion 12 in key terminals to be hunted carries out it. Namely, the change control portion 12 in key terminals to be hunted transmits a regulation packet to the counterpart terminal, carries out establishing or cancellation of a call to the slave terminal, and then transmits a cancellation of regulation packet to the counterpart terminal. Further, the control portion 12 performs the process for renewing the number of idle links in the hunting selection list 13 by the number of concentrateable links.

When the change request reception portion 11 in key terminals to be hunted finishes the terminal concentration of the number of concentrateable communication links, it cancels the incoming call regulation and also cancels the indication of "Key State" in the key selection list 13, and finally advises the master terminal 400 of the slave terminals in use after the concentration, thereby ending the process.

As described above, according to the embodiment (2) of the present invention, by providing the key selection list 13 which indicates the possibility of selecting slave terminals as call-acceptable terminals and the number of idle slave links, a range of slave terminals to be concentrated is automatically determined, thereby processing of the concentration being carried out. A notice of the result of slave terminal concentration is made in the same way as in the embodiment (1) according to the present invention.

Figure 8:
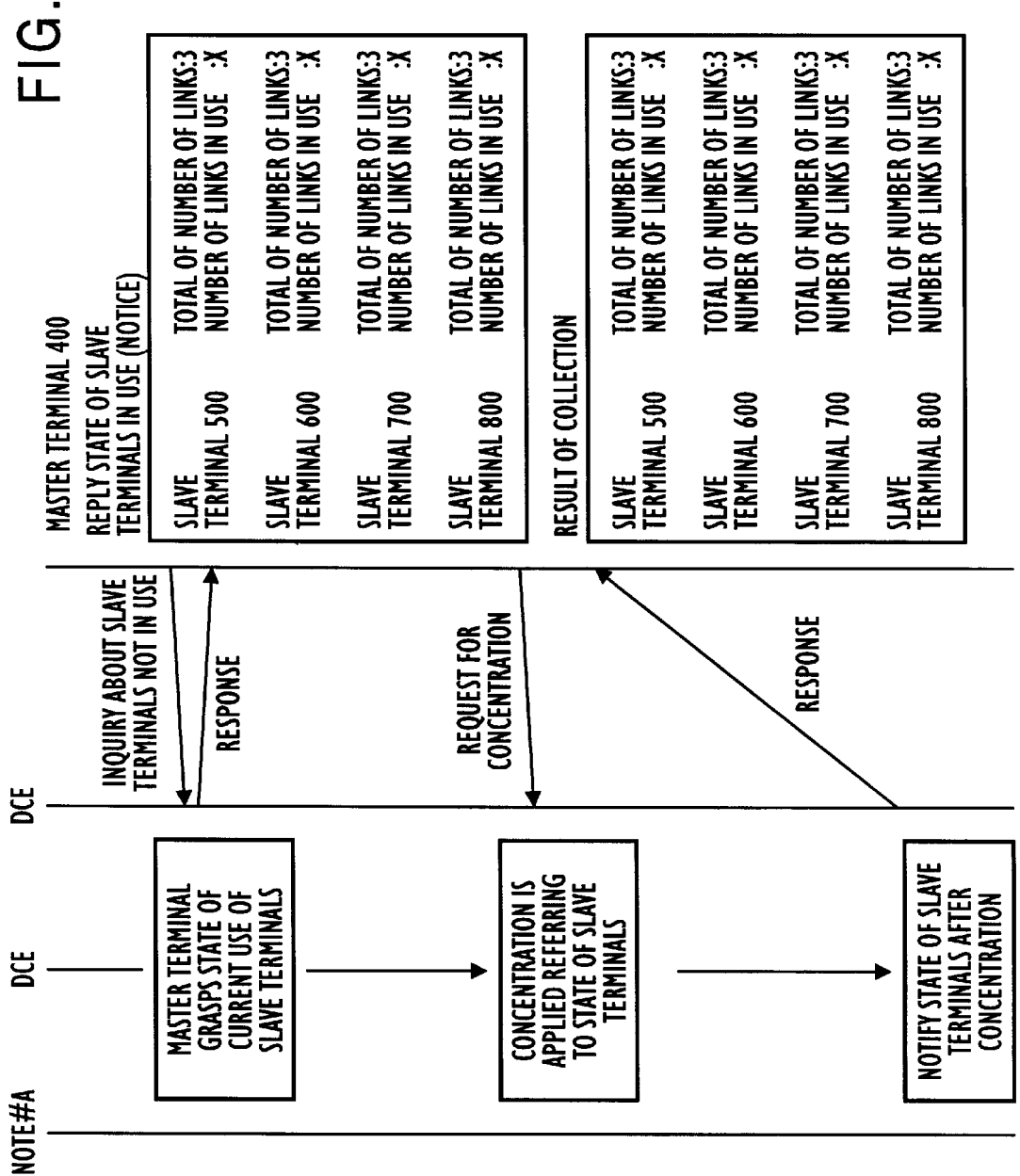
FIG. 8 is a diagrammatic representation showing a concrete example of the method according to the invention.

FIG. 8 is a diagrammatic representation showing a concrete example of the method according to the present invention. According to this method, the state of link establishment at respective slave terminals can be notified to the master terminal, so that the figure shows the case where the master terminal instructs the network to perform the process of slave terminal concentration, showing the concrete contents of the concentration. In the figure, DTE (Data Terminal Equipment) corresponds to the data terminals while DCTE (Data Circuit Terminating Equipment) corresponds to the data switching system, e.g., a packet switching system.

The master terminal 400 asks respective slave terminals about their state of use. In response to this inquiry, respective slave terminals notify the master terminal of their current state of use, i.e., a total number of links and the number of links in use, from which the master terminal can grasp the state of slave terminals currently in use.

Further, since the master terminal 400 transmits the request for slave terminal concentration taking into account the current state of each slave terminal, it becomes possible to carry out slave terminal concentration by precisely designating the order of concentration, for instance starting from the first concentrateable slave terminal and moving to the second, the third and so forth. Namely, if the process for slave terminal concentration is applied to the first concentrateable slave terminal but slave links as obtained therethrough are still lacking in the number thereof, the process is sequentially moved and applied to the second concentrateable slave terminal, the third one, and so forth. Through these sequential processes, the result of slave terminal concentration is obtained as shown in the figure. After the slave terminal concentration is finished, the state of respective slave terminals is notified to the master terminal in the same way as in the embodiment (1) according to the present invention.

According to the method of the invention, the incoming call terminal of the communication link can be changed, so that the processes at the incoming call terminal and transmitting terminal prior to the change are transferred to a different incoming call terminal. However, it is possible to transmit a notice to the incoming call terminal to be concentrated by notifying respective facility parameters at the time of call establishment from a communication link management memory (not shown) to the incoming call terminal.

Execution of the slave terminal concentration according to the method of the present invention is not always limited to the time when the master terminal requests it. For instance, if a predetermined traffic condition is satisfied, it is possible to provide a service mode in which the network automatically starts up the slave terminal concentration.

Figure 9A:
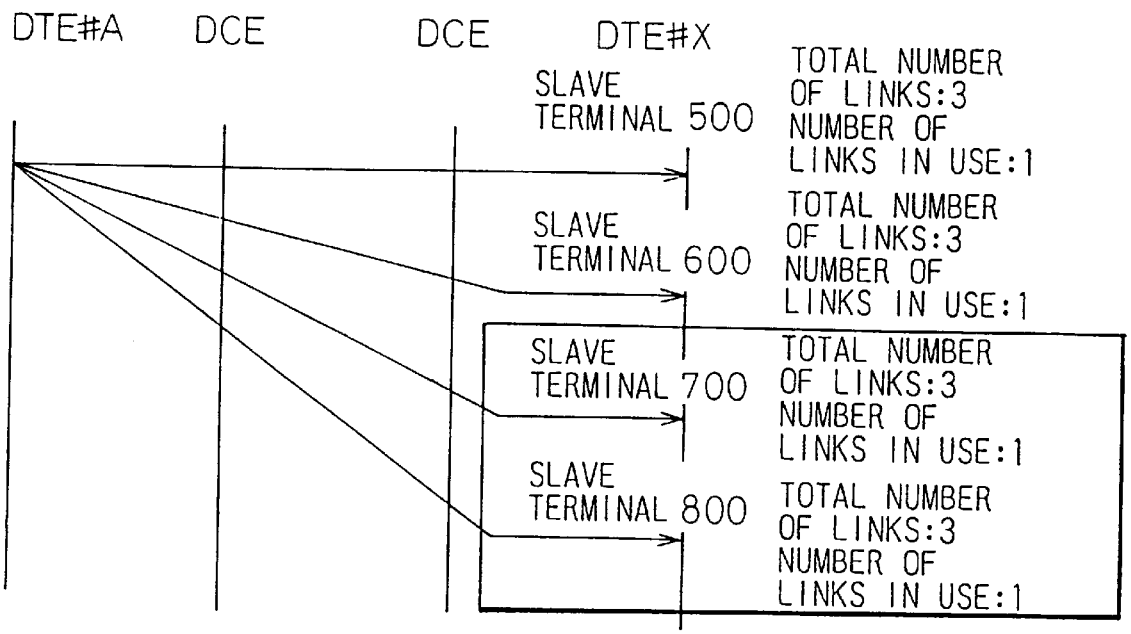
FIG. 9A is a diagrammatic representation showing an application of the method according to the invention, which corresponds to the state before performing the concentration.
Figure 9B:
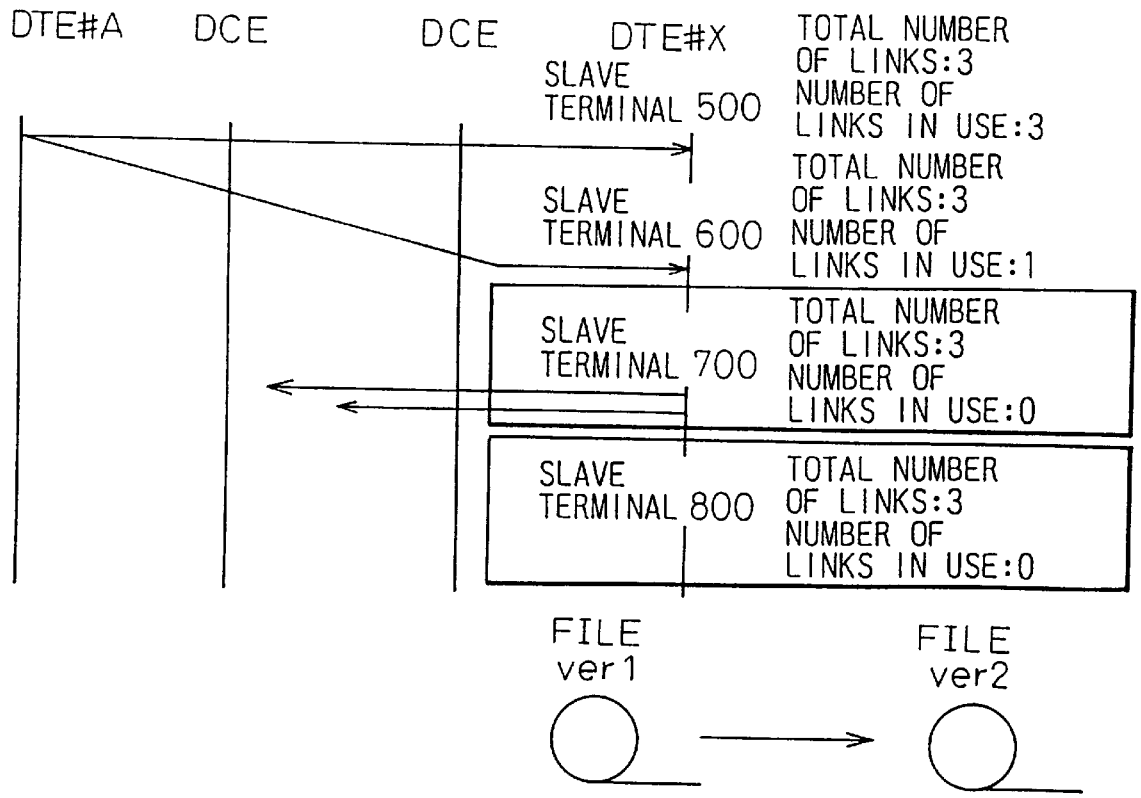
FIG. 9B is a diagrammatic representation showing an application of the method according to the invention, which corresponds to the state after performing the concentration.

FIGS. 9A and 9B are diagrammatic representations showing an application of the method according to the invention, from which the effect brought about by the present invention will be understood. In this application, the slave terminal concentration is applied to the state of communication where each slave terminal is using only one link, thereby objective slave terminals being separated from the other slave terminals can be used for other purposes, for instance as a terminal for exclusive use in transmission or for use in file maintenance. FIG. 9A shows the state before carrying out slave terminal concentration while FIG. 9B indicates the resultant state of slave terminal concentration after carrying out thereof.

Now, let us assume that DTE#A (Data Terminal Equipment No. A) is connected, as shown in FIG. 9A, with each of slave terminals (500) through (800) of DTE#X (Data Terminal Equipment No. X) via only a single communication link, and that it is desired that slave terminals (700) and (800) be temporally used as terminals for other purposes, not as slave terminals. In this case, it is possible to separate slave terminals (700) and (800) from other slave terminals by applying slave terminal concentration to them without canceling the communication to the counterpart terminal as shown in FIG. 9B, and to use the slave terminal (700) as a terminal for exclusive use in transmission or to use the slave terminal (800) as a terminal for use in file maintenance for switching a file Ver. 1 to a Ver. 2.

So far, respective embodiments of the present invention have been described for the case of using a packet switching system, but it should be noted that the present invention is not limited to such particular embodiments and is applicable to other data switching systems such as a frame relay exchange system, ATM switching system, and so forth.

As described above, according to the present invention, in an incoming call communication service using key groups to be hunted provided through a data switching system, the concentration of respective slave terminals in each traffic state becomes possible. Also, it becomes possible to notify the state of use of slave terminals to the master terminal.

The key selection list indicates the possibility of selection of call-acceptable terminals at respective slave terminals, so that at the time of executing the slave terminal concentration, the range of slave terminals to be concentrated is automatically determined and processing of slave terminal concentration can be efficiently carried out.

We claim:

1. A method of concentrating a plurality of slave terminals to be hunted in a packet switching communication service using a key number of a master terminal wherein the plurality of slave terminals are hunted, comprising the steps of:

providing the packet switching system having the master terminal for a group formed of the plurality of slave terminals;

connecting a call to the master terminal with an idle slave terminal in said group, wherein if the master terminal requests slave terminal concentration through a change request reception portion in key terminals to be hunted, judging by a communication control portion in key terminals to be hunted for managing the state of establishment of a communication link at slave terminals, propriety of slave terminal concentration, and if possible., requesting a change control portion in key terminals to be hunted to carry out the slave terminal concentration without canceling the communication link to a counterpart terminal, and upon completion of said slave terminal, concentration notifying the master terminal by a communication link control portion in key terminals to be hunted, the resultant state of use of slave terminals after the slave terminal concentration, said notifying being through a change request reception portion in key terminals to be hunted.

2. A method as in claim 1, wherein while slave terminal concentration is in process, the further steps of the communication link control portion in key terminals to be hunted regulating the communication to a counterpart communication terminal and canceling said regulation upon completion of the slave terminal concentration.

3. A method as in claim 2, further comprising the steps:

providing a key selection list indicating whether respective slave terminals are in the call-acceptable state or in the call-not-acceptable state, renewing by said communication link control portion in key terminals to be hunted the state of respective slave terminals in said key selection list depending on the state of establishment of communication links at respective slave terminals, and at the time of carrying out slave terminal concentration, judging by said communication link control portion in key terminals to be hunted propriety of slave terminal concentration by referring to said key selection list and instructing said change control portion in key terminals to be hunted to carry out the slave terminal collection.

4. A method as in claim 3, wherein said key selection list indicates a number of idle links at respective slave terminals, and comparing by said communication link control portion in key terminals to be hunted a sum of a number of idle links as counted from a concentration start terminal number with a number of call incoming links in use and judging that slave terminal concentration is impossible if the sum of the number of idle links is less than the number of incoming call links in use and judging that slave terminal concentration is possible if the sum is more than the number of incoming call links in use.

5. A method as in claim 4, wherein said key selection list indicates whether slave terminal concentration is in process or not in process, and referring by said communication link control portion in key terminals to be hunted to said key selection list when a request for establishment of a communication link is made by another terminal, and rejecting said request if slave terminal concentration is in process and allowing said request if slave terminal concentration is not in process.

6. A method as in claim 3, wherein said key selection list indicates whether slave terminal concentration is in process or not in process, and referring by said communication link control portion in key terminals to be hunted to said key selection list when a request for establishment of a communication link is made by another terminal, and rejecting said request if slave terminal concentration is in process and allowing said request if slave terminal concentration is not in process.

7. A method as in claim 1, comprising further steps of providing a key selection list indicating whether respective slave terminals are in the call-acceptable state or in the call-not-acceptable state, renewing by said communication link control portion in key terminals to be hunted the state of respective slave terminals in said key selection list depending on the state of establishment of communication links at respective slave terminals, and at the time of carrying out slave terminal collection, judging by said communication link control portion in key terminals to be hunted propriety of slave terminal concentration by referring to said key selection list and instructing said change control portion in key terminals to be hunted to carry out the slave terminal concentration.

8. A method as in claim 7, wherein said key selection list indicates a number of idle links at respective slave terminals, and comparing by said communication link control portion in key terminals to be hunted a sum of a number of idle links as counted from a concentration start terminal number with a number of call incoming links in use and judging that slave terminal collection is impossible if the sum of the number of idle links is less than the number of incoming call links in use and judging that slave terminal collection is possible if the sum is more than the number of incoming call links in use.

9. A method as in claim 8, wherein said key selection list indicates whether slave terminal concentration is in process or not in process, and referring by said communication link control portion in key terminals to be hunted to said key selection list when a request for establishment of a communication link is made by another terminal, and rejecting said request if slave terminal concentration is in process and allowing said request if slave terminal concentration is not in process.

10. A method as in claim 7, wherein said key selection list indicates whether slave terminal concentration is in process or not in process, and referring by said communication link control portion in key terminals to be hunted to said key selection list when a request for establishment of a communication link is made by another terminal, and rejecting said request if slave terminal concentration is in process and allowing said request if slave terminal concentration is not in process.

* * * * *